June 18, 1957 E. B. LEAR ET AL 2,796,301
LOCK FOR ENDLESS TRACK
Filed April 10, 1956 2 Sheets-Sheet 1
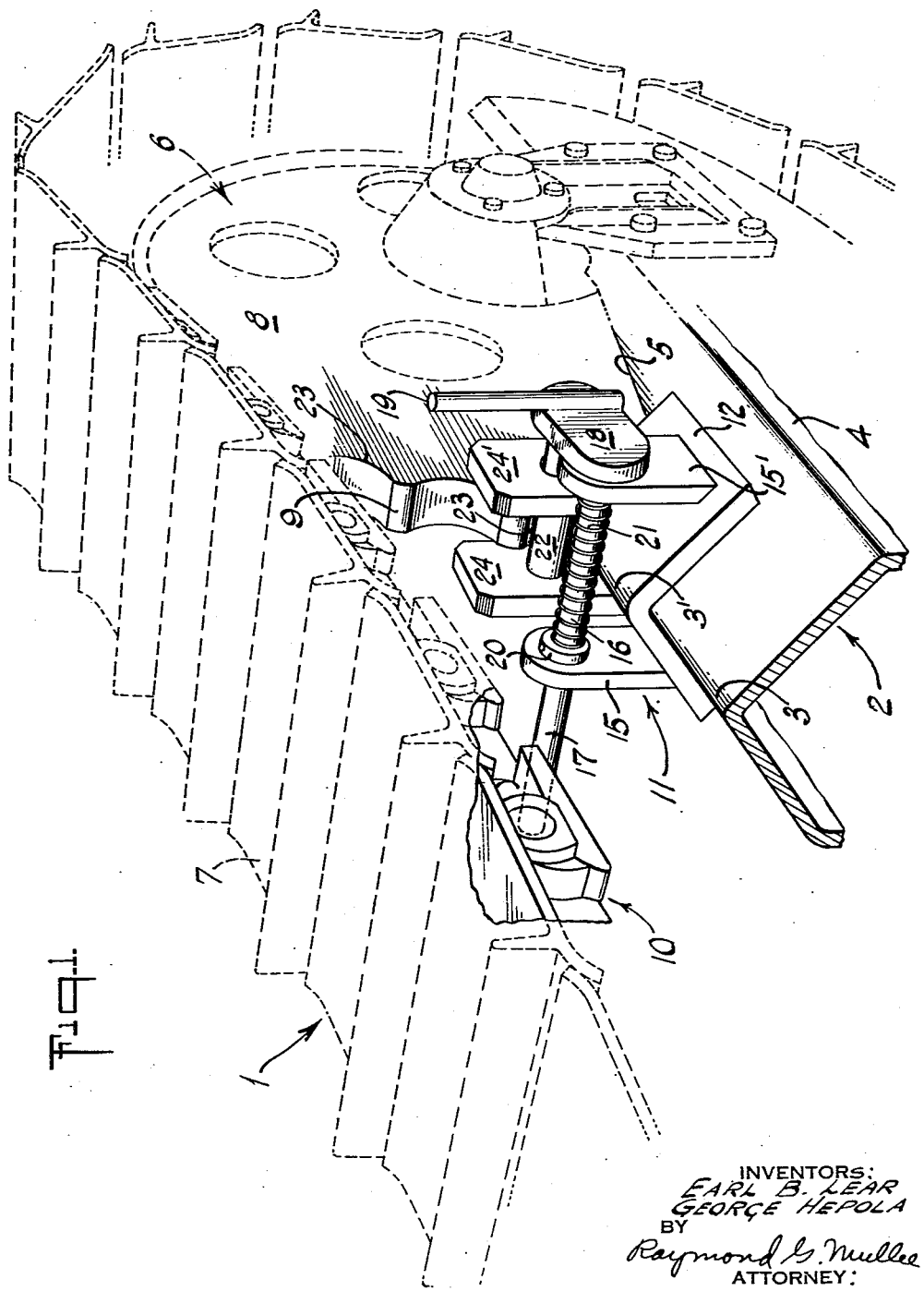
INVENTORS:
EARL B. LEAR
GEORGE HEPOLA
BY
Raymond G. Mueller
ATTORNEY:

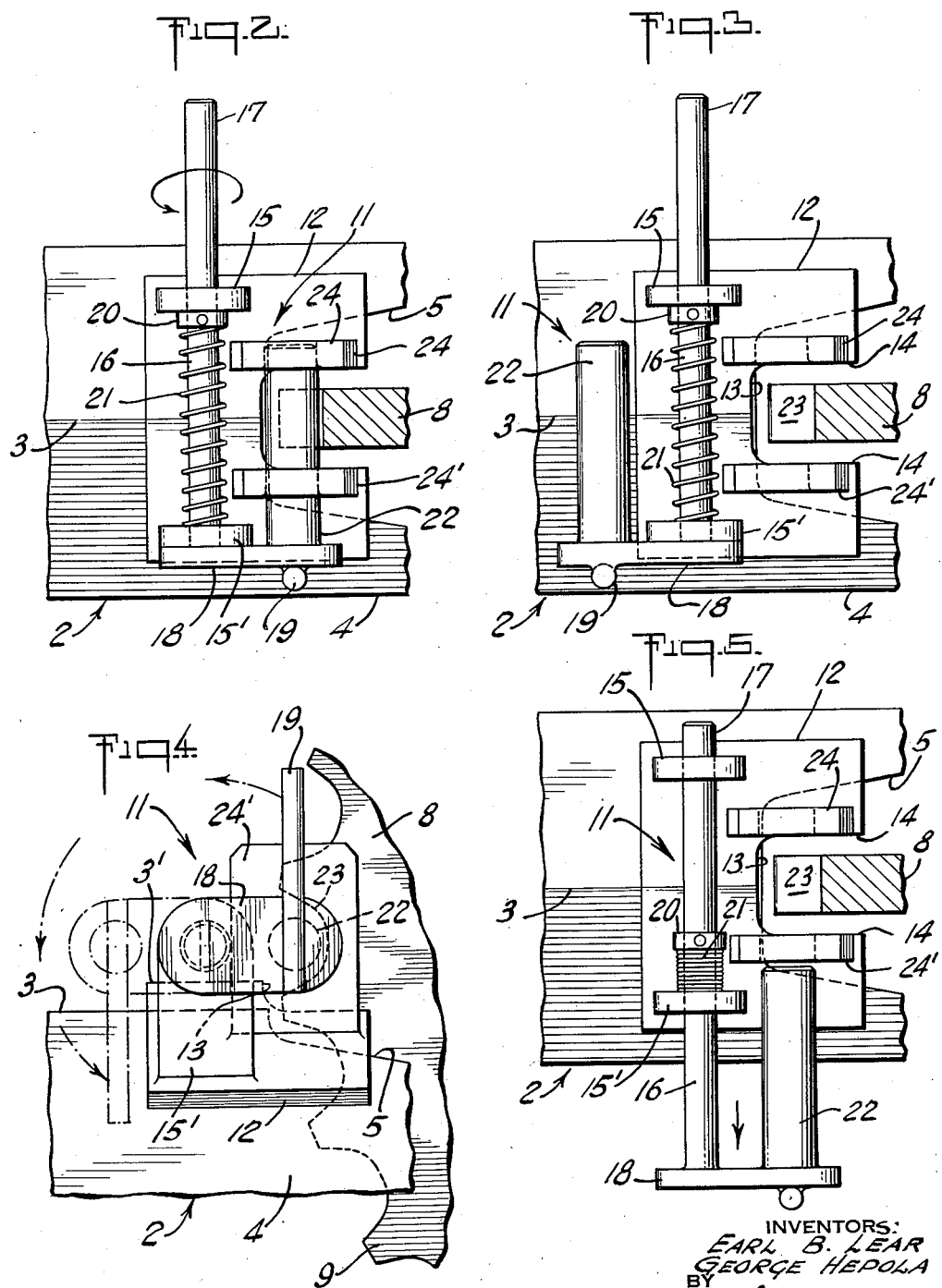

United States Patent Office 2,796,301
Patented June 18, 1957

2,796,301

LOCK FOR ENDLESS TRACK

Earl B. Lear and George E. Hepola, Utica, N. Y., assignors to Chicago Pneumatic Tool Company, New York, N. Y., a corporation of New Jersey Application April 10, 1956, Serial No. 577,367

12 Claims. (Cl. 305—1)

This invention pertains to endless track vehicles, and is particularly concerned with novel and improved means for locking vehicles of this type against undesirable travel.

Endless track vehicles serve as carriages and supports for work machinery of various forms; such as rock drill equipment, cranes, scoops, and others. When a vehicle of this type is parked on an uneven surface or slope, the weight of the vehicle tends to cause it to travel on its tracks. Such travel is undesirable because of accidents and damage that may result. Such travel is also undesirable when the equipment mounted thereon is in operation, particularly in the case of drilling machinery, where travel of the vehicle will interfere with the efficient operation of such equipment. Undesirable travelling of the vehicle is also likely to occur as a reaction to the operation of the heavy work machinery carried on the vehicle, even though the latter may be on a level surface. Accordingly, an object of this invention is to provide improved, novel and practical means for restraining an endless track vehicle against undesirable travel; such as, when parked, or during work operations of equipment carried thereon, and the like.

A still further and more particular object of the invention is to provide means for locking a sprocket wheel engaging an endless track member so as to restrain travel of the latter.

The invention further lies in the particular construction and arrangement of its component parts, as well as in their cooperative association with one another to effect the objects intended herein.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description and are not to be construed as defining the limits of the invention.

In the drawings:

Fig. 1 is a perspective view of a track unit of an endless track vehicle embodying the invention, the drawing showing the latch bolt in latched engagement with the sprocket wheel;

Fig. 2 is a top plan view showing the latch bolt in engaged position;

Fig. 3 is a top plan view showing the latch bolt in unlatched position;

Fig. 4 is a side elevation view of Fig. 2; and

Fig. 5 is a view showing the latch bolt drawn to a position for inserting it in the keeper plates.

Reference is now directed to the drawings wherein there is shown a track unit 1 of an endless track vehicle, the latter comprising a pair of track units 1 of identical structure. Track unit 1 includes a supporting frame 2 having an inverted V or peaked top portion 3. The latter integrally bridges a pair of depending side plates 4 disposed in spaced parallel relation to each other. The side plates 4 extend longitudinally beyond opposite ends of the peaked portion 3 so as to form a fork 5 between them at one end of the frame 2, and a similar fork not shown, at the opposite end. Rotatably supported in each fork between the side plates is a wheel, generally designated 6. Carried on the wheels for endless travel thereon is a conventional endless track member 7. One of the wheels, here, wheel 8, is a sprocket wheel having a succession of teeth 9 about its periphery which engage a complementary train of teeth 10 along the underside of the track member. Wheel 8 is powered by an associated motor driven gear train, not shown. When wheel 8 is driven, the teeth thereof successively engage the teeth of the track member and cause the latter to travel about the sprocket wheel, and about the other wheel in the other fork, not shown. This other wheel is an idler wheel. It may be a sprocket wheel to engage the travelling track, or it may carry a peripheral groove in which the train of teeth on the underside of the track may move as the track travels.

The sprocket wheel 8 may be forced to rotate at times when it is not being driven by its motor, as when the vehicle is parked upon a slope and the inertia of the wheel is overpowered by the weight of the vehicle. It may also be caused to rotate in reaction to the operations of heavy working machinery mounted on the vehicle, even though the vehicle be on a level surface. Travel of the vehicle caused by such action of a sprocket wheel member is undesirable, and suitable means is provided herein to restrain the same.

Locking means generally designated 11 is provided to lock the sprocket wheel of a track unit against rotation, so as to restrain travel of the latter, especially at times when the sprocket wheel is not being driven by its motor. This locking means includes a mounting plate 12 which is peaked so as to complement the peaked portion 3 of the supporting frame member. The mounting plate is fixed to the latter.

A portion of the mounting plate overhangs the adjacent fork 5, and provides a bifurcation 13 (Fig. 3) the arms 14 of which extend alongside of and in spaced relation to opposite faces of the sprocket wheel. It is to be noted that the peak 3' of the mounting plate is aligned with the periphery of the sprocket wheel. Projecting vertically from the mounting plate at opposed sides of the peaked portion thereof, is a pair of spaced parallel upright members 15, 15'.

Transversely slidable through aligned holes in the upper portions of the uprights is a horizontally disposed cylindrical shaft 16. The latter has a close sliding fit in the holes of the uprights. An extended end 17 of the shaft projects through the inner upright member a sufficient distance so as to permit a desired transverse movement of the shaft in an outward direction (Fig. 5) without the shaft slipping free of this inner upright member.

A spacer plate 18 carried at one end thereof upon the outer end of shaft 16 extends at right angles to the latter. A handle 19 is carried by the outer face of the plate. Shaft 16 may be drawn outwardly by manually pulling on the handle, or it may be rotated in the uprights 15, 15' by turning the handle. A collar 20 carried on shaft 16 between the uprights limits the extent to which the shaft may be drawn outwardly or moved inwardly. A coil spring 21 about the shaft and expanded between the collar and the inner face of the outer upright member 15' normally urges the shaft inwardly. The shaft is limited in this inward movement by abutment of the collar against the inner upright member 15.

A latch bolt 22 is laterally slidable in the usual notch or recess 23 existing between each pair of adjacent teeth of the sprocket wheel and serves to lock the latter against rotation. It is fixed at one end to the inner face of the opposite end of the spacer plate 18. The latch bolt extends inwardly in spaced parallel relation to cross shaft 16, and is relatively shorter than the latter. The latch bolt has a normal, unlatched position, as in Fig. 3, where it rests upon the peak of frame member 2.

To move the latch bolt from an unlatched position (Fig. 3) to a latched position (Figs. 2, 4, 1), the handle is manually pulled in an outward direction so as to draw shaft 16 outwardly against the tension of the coil spring. The shaft is drawn outwardly until the free end of the latch bolt 22 is well clear of the vertical plane of the outer face of the sprocket member. While the shaft is in this drawn condition, the spacer plate 18 is rotated clockwise until the latch bolt is on a line with the center of a recess 23 between a pair of sprocket teeth (Fig. 5). The manual hold on the handle is then relaxed so as to permit the latch bolt to be drawn in between the sprocket teeth as coil spring 21 restores, (Figs. 2, 4, 1).

It is desirable that the radius of the latch bolt be slightly less than that of the recesses 23 existing between the sprocket teeth. This permits a latch bolt of substantial thickness and strength to be provided.

To avoid any possibility of the latch bolt being angularly forced out from between the teeth of the sprocket wheel, a pair of upright keeper posts 24, 24′ is provided. These are unitary at their lower ends with the mounting plate 12, and they extend vertically upwards in spaced parallel relation to each other. The keeper posts provide a pair of aligned holes through which the latch bolt can freely pass when it is inserted between the teeth of the sprocket member. The keeper posts are located inwardly of the uprights 15, 15′ and in close spaced relation to opposite faces of the sprocket wheel. This arrangement serves to limit the extent to which the shaft must be withdrawn to permit the free end of the latch bolt to clear the outer keeper post 24′.

When the latch bolt is disposed in a recess between the sprocket teeth, it is supported at opposite ends by the keeper posts against up or downward angular movement, and, accordingly, cannot be forced out from between the teeth by angular pressure of the sprocket wheel or by any rocking action of the latter. When the sprocket wheel of a track unit is so latched, the associated track member 7 is restrained against travel.

In the latching operation, the sprocket wheel is first caused to turn until the horizontal axis of a recess 23 between a pair of teeth is on the same plane as the horizontal axis of the holes of the keeper posts. This facilitates disposition of the latch bolt in the recess between the sprocket teeth.

A similar locking arrangement may be applied to the other track unit of the vehicle, so as to provide individual locking of each track unit.

While an embodiment of the invention has been illustrated and described in detail, it is to be expressly understood that the invention is not limited thereto. Various changes may be made in the design and arrangement of the parts without departing from the spirit and scope of the invention as the same will now be understood by those skilled in the art, and it is our intent, therefore, to claim the invention not only as shown and described, but also in such forms and modifications thereof as may be reasonably construed to fall within the spirit of the invention and the scope of the appended claims:

What is claimed is:

1. In an endless track vehicle including an endless track member, a rotatable sprocket wheel engaging the track member, a frame carrying the sprocket wheel, and means mounted to the frame and slidably engageable with the sprocket wheel for restraining rotation of the latter and, as a consequence, restraining movement of the track member by the sprocket wheel.

2. In an endless track vehicle including an endless track member, a supporting frame member for the track, and a sprocket wheel supported for rotation in the frame member, and drivingly engaging the track member, latch means mounted to the frame member in close proximity to the sprocket wheel and including a latch bolt slidable into locking engagement with the sprocket wheel for restraining rotation of the latter and consequent travel of the engaged track member.

3. In an endless track vehicle including an endless track member having a train of teeth along its undersurface, a supporting frame for the track member, and a sprocket wheel supported for rotation in the frame and having a succession of spaced teeth about its periphery engageable successively with the teeth of the track member for driving the latter; means for locking the sprocket wheel against rotation, comprising a bracket piece mounted to the frame in close proximity to the sprocket wheel, a latch bolt carried by the bracket piece and movable from a normal unlatched position to a position in a space between a pair of teeth of the sprocket wheel, and means for retaining the bolt in the latter position, whereby the sprocket wheel is restrained against rotation.

4. The combination in a vehicle, of an endless track unit having an endless track member and a supporting frame for the latter; a sprocket wheel rotatably carried in the frame and engaged with the track member for driving the same; a pair of keeper plates supported on the frame in close spaced relation to opposite faces of the sprocket wheel; and an elongated bolt slidable in order, through a complementary hole in a keeper plate, a complementary recess in the sprocket wheel, and through a complementary hole in the second keeper plate so as to lock the sprocket wheel against rotation.

5. In an endless track vehicle including an endless track unit having an endless track member, a supporting frame having a fork in each end, a wheel rotatable in each fork and having its periphery in supporting engagement with the track member, at least one of said wheels being a sprocket wheel having teeth about its periphery engaging complementary teeth along the underside of the track member; the combination with said frame and sprocket wheel of means to lock the sprocket wheel against rotation, the latter means comprising a pair of spaced uprights fixed to opposite sides of the frame, an elongated horizontally disposed shaft mounted in the uprights for rotation as well as transverse slidable movement therein, a spring means about the shaft normally urging the shaft in an inward direction and stop means limiting the extent of this inward movement, a latch bolt of relatively shorter length than the shaft and disposed in spaced parallel relation to the latter, a spacer plate fixed at opposite ends to an outer end of the latch bolt and to a corresponding end of the shaft, inner and outer upright keeper members supported by the frame adjacent opposite sides of the fork carrying the sprocket wheel, the keeper members providing a pair of opposed holes with which a succession of complementary recesses between the teeth of the sprocket wheel are successively alignable as the sprocket wheel rotates, and a handle on the spacer plate to enable the shaft to be manually pulled in outward direction against the tension of the coil spring until the free end of the relatively shorter latch bolt is carried clear of the outer keeper member, and the handle further serving to enable rotation of the shaft in the latter position so as to carry the latch bolt from a normal unlatched position to a position in axial alignment with the holes of the keeper members and an aligned recess of the sprocket wheel, the latch bolt being disposable in the aligned members upon allowing the compression spring to restore, whereupon the sprocket wheel becomes latched against rotation.

6. In an endless track vehicle as defined in claim 5, wherein the spaced uprights are unitary with opposite laterally disposed ends of a base plate fixed atop of the supporting frame.

7. In apparatus including an endless track member and a sprocket wheel engaged to drive the latter, means for locking the sprocket wheel against rotation and as a consequence, locking the endless track member against travel, the said means comprising a pair of stationary supports disposed in close spaced relation to opposite faces of the sprocket wheel and having a pair of aligned holes, and a latch bolt disposable in the holes of the supports at its ends and in a peripheral notch of the sprocket wheel in its mid-portion, so as to restrain the sprocket wheel against rotation.

8. In apparatus according to claim 7, wherein a second pair of laterally spaced stationary supports is provided in close longitudinal spaced relation to the periphery of the sprocket wheel, an elongated shaft is supported in the second pair of supports for transverse slidable movement as well as rotatable movement, and a spacer member connects corresponding ends of the latch bolt and the shaft, whereby this arrangement the latch bolt is transversely slidable in an outward direction with the shaft and is pivotable upon rotation of the latter from an unlatched position to a latching position for disposition inwardly in the first mentioned pair of supports and in the notch of the sprocket wheel.

9. In apparatus according to claim 8, wherein a handle is provided on the spacer plate for effecting transverse slidable as well as turning movement of the elongated shaft.

10. In apparatus according to claim 8, wherein a coil spring carried upon the shaft normally urges the latter in an inward direction; and when the shaft is transversely moved in an outward direction the coil spring is compressed, so that when the latch bolt is rotated to latching position, permitted relaxing of the coil spring will draw the shaft and latch bolt inwardly to dispose the latter in the first pair of stationary supports and in the notch of the sprocket wheel.

11. In apparatus including an endless track member, a sprocket wheel engaged to drive the latter, means for locking the sprocket wheel against rotation and, as a consequence, the track member against travel, said means comprising a latch bolt disposable transversely in a complementary opening in the sprocket wheel, and a pair of stationary supports in spaced relation to opposite faces of the wheel adapted to retain opposite end portions of the latch bolt when the latter is so disposed.

12. In apparatus of the character described including a track member, a sprocket wheel engaged to drive the latter, and means for locking the sprocket wheel against rotation and, as a consequence, the track member against travel, the improvement in the locking means which is characterized by a member engageable with the sprocket wheel, and stationary means for holding the member engaged with the sprocket wheel so as to restrain rotation of the latter.

References Cited in the file of this patent
UNITED STATES PATENTS

| | | |
|---|---|---|
| 595,522 | Chambers | Dec. 14, 1897 |
| 1,890,728 | Fundom | Dec. 13, 1932 |